United States Patent
Wang et al.

(10) Patent No.: US 11,248,824 B2
(45) Date of Patent: Feb. 15, 2022

(54) CONTROL SYSTEM AND CONTROL METHOD FOR FROSTLESS, MULTIVARIABLE COUPLING, AND HEAT PUMP-BASED HOT BLAST STOVE

(71) Applicant: JIANGSU TENESUN ELECTRICAL APPLIANCE CO., LTD., Nantong (CN)

(72) Inventors: Yujun Wang, Nantong (CN); Xiaojie Ma, Nantong (CN); Ying Wang, Nantong (CN); Tianshu Wang, Nantong (CN); Yi Yang, Nantong (CN)

(73) Assignee: JIANGSU TENESUN ELECTRICAL APPLIANCE CO., LTD., Nantong (CN)

( * ) Notice: Subject to any disclaimer, the term of this patent is extended or adjusted under 35 U.S.C. 154(b) by 24 days.

(21) Appl. No.: 16/757,944

(22) PCT Filed: Oct. 30, 2018

(86) PCT No.: PCT/CN2018/112621
§ 371 (c)(1),
(2) Date: Apr. 21, 2020

(87) PCT Pub. No.: WO2019/085887
PCT Pub. Date: May 9, 2019

(65) Prior Publication Data
US 2020/0263909 A1    Aug. 20, 2020

(30) Foreign Application Priority Data
Oct. 31, 2017   (CN) .......................... 201711053800.X

(51) Int. Cl.
*F25B 47/02* (2006.01)
*F25B 49/00* (2006.01)
(Continued)

(52) U.S. Cl.
CPC ................ *F25B 41/20* (2021.01); *A23B 9/08* (2013.01); *F25B 47/02* (2013.01); *F25B 49/00* (2013.01);
(Continued)

(58) Field of Classification Search
CPC ...... F25B 47/02; F25B 49/00; F25B 2347/02; F25B 2347/021; F25B 2400/23;
(Continued)

(56) References Cited

U.S. PATENT DOCUMENTS 1,675,285 A * 6/1928 Vance ..................... F26B 23/10
  34/205
3,625,812 A * 12/1971 Gudaz ....................... D21F 5/00
  162/253

(Continued)

FOREIGN PATENT DOCUMENTS

CN    106643107 A *  5/2017
WO    WO-8203681 A1 * 10/1982  .............. A21B 1/48
WO    WO-2019105888 A1 *  6/2019  ............. F26B 15/18

*Primary Examiner* — Jianying C Atkisson
*Assistant Examiner* — Miguel A Diaz
(74) *Attorney, Agent, or Firm* — CBM Patent Consulting, LLC

(57) ABSTRACT

A control system and method for a frostless, multivariable coupling and heat pump-based hot blast stove are used for grain drying. A first heat exchanger, a second heat exchanger, a main solution pool, corresponding pipelines, and a temperature detector are configured in the control system. A first heat pump unit, a second heat pump unit and a third heat pump unit are formed. A preheating zone, a low temperature zone, a medium temperature zone and a high temperature zone are sequentially formed on an air supply pipeline from a fresh air inlet to a fresh air outlet. A frostless operation procedure is provided. Through the configuration, the control system and method for a frostless, multivariable coupling and heat pump-based hot blast stove can imple- (Continued)

ment heat supply in a gradient heat-circulation preheating mode and a gradient heat-circulation frostless mode.

8 Claims, 8 Drawing Sheets

(51) Int. Cl.
    *F25B 41/20*     (2021.01)
    *A23B 9/08*     (2006.01)
    *F26B 21/00*     (2006.01)

(52) U.S. Cl.
    CPC ....... *F25B 2347/02* (2013.01); *F25B 2400/23* (2013.01); *F26B 21/001* (2013.01); *F26B 2200/06* (2013.01)

(58) Field of Classification Search
    CPC ........ A23B 9/08; F26B 21/001; F26B 21/002; F26B 23/10; F26B 2200/06
    See application file for complete search history.

(56) References Cited

U.S. PATENT DOCUMENTS

| | | | | |
|---|---|---|---|---|
| 3,791,049 | A * | 2/1974 | Smith, Jr. | D21F 5/00 |
| | | | | 34/452 |
| 4,015,341 | A * | 4/1977 | McKinney | A23B 9/04 |
| | | | | 34/263 |
| 4,125,945 | A * | 11/1978 | Westelaken | A23B 9/08 |
| | | | | 34/167 |
| 5,261,166 | A * | 11/1993 | Seeley | F26B 13/104 |
| | | | | 34/267 |
| 9,200,834 | B1 * | 12/2015 | Ball, Jr | F26B 21/022 |
| 11,131,502 | B2 * | 9/2021 | Kisner | H02J 50/10 |
| 2012/0111715 | A1 * | 5/2012 | Krois | F26B 23/001 |
| | | | | 201/15 |
| 2016/0084573 | A1 * | 3/2016 | Sugar | F26B 3/28 |
| | | | | 432/29 |
| 2018/0058759 | A1 * | 3/2018 | Wie | A23B 7/02 |
| 2020/0072550 | A1 * | 3/2020 | Wang | F26B 21/001 |

* cited by examiner

CONTROL SYSTEM AND CONTROL METHOD FOR FROSTLESS, MULTIVARIABLE COUPLING, AND HEAT PUMP-BASED HOT BLAST STOVE

BACKGROUND OF THE INVENTION

1. Technical Field

The invention belongs to the technical field of grain drying, and particularly relates to a control system and method for a frostless, multivariable coupling and heat pump-based hot blast stove.

2. Description of Related Art

In recent years, grain drying machines have rapidly developed in China, but the entire industry still remains at a stage characterized by disorganized markets, outdated product technologies, poor enterprise innovation capability, weak R&D ability, high one-time purchase costs, and the like. Thus, it is necessary to promote the dryer industry to develop sustainably, healthily and orderly in the aspects of policies and regulations, markets and technologies. Existing grain drying techniques include natural air-drying, drying in the sun, drying by combustion of chemical fuels, electrical heating, infrared drying, microwave drying, and the like. However, all these techniques consume a huge amount of energy, produce severe pollution, and are poor in safety. Apparently, the outdated drying facilities are not in conformity with the sustainable development trend in nowadays society, and it is becoming more and more urgent to develop a safe, environment-friendly and energy-saving drying facility to replace these outdated ones.

With the increase of energy consumption in China, the energy utilization rate per capita can no longer satisfy the requirements, and under the macro-control of the national government over energy utilization, the superiority of heat pump equipment in energy saving and emission reduction is becoming increasingly obvious. Compared with oil-fired or gas-fired boilers, the heat pump equipment can annually save energy by about 70% on average, and the advantage of low operating cost of the heat pump equipment is becoming more and more outstanding with the fall of electricity price and the rise of fuel price. The heat pump equipment is an environment-friendly product which generates no burning emission and adopts an environment-friendly refrigerant harmless to the ozone sphere; and the heat pump equipment is fully automatically controlled and does not need to be manually attended, so that labor costs are saved. However, the heat pump-based hot blast stoves on the present market are at the initial promotion stage and need to be innovated and improved in many aspects.

The heat pump-based hot blast stoves on the present market still have the following problems: 1, when the system operates in winter, the outdoor environmental temperature is low, a thick frost layer may be formed on the surface of the evaporator due to the decrease of the evaporating temperature, as a result, the performance of the unit is reduced, and even normal heat exchange of the unit is affected, so that the unit has to be stopped due to the failure; and when a traditional reverse defrosting method is adopted, the unit has to be stopped, which results in low drying efficiency; 2, when the system operates in summer, the high outdoor environmental temperature leads to a rise of the condensing temperature of the system, and after fresh air is subjected to heat exchange in the condenser, heat in the condenser cannot be completely released, which causes severe heat waste, reduces the operating efficiency of the system, and exerts an adverse impact on grain drying; 3, after the fresh air flows through the heat exchanger at the same temperature, the temperature of the fresh air cannot be increased to a required temperature; 4, when the system operates in winter, on account of a low temperature of the condenser on the air inlet side, the condensation effect is good, the high-low pressure difference of the system is small, the circulation power of the unit cannot be guaranteed, and the operating efficiency of the unit is low; and meanwhile, the evaporating pressure of the system is low, and hence, fins on the evaporation side are more likely to be frosted; 5, due to the high temperature of the air outlet side, the condensing temperature of the backmost system close to the air outlet side of the unit is high, the system always operates under a high load, and consequentially, the life of the compressor will be greatly shortened.

Chinese Invention Patent Application No. 201010209086.0 discloses an air-returning pressure-reduction high-temperature hot blast stove capable of removing dust and smoke with an exhaust pipe, wherein a waste heat return duct is arranged above an upper hearth of a combustion furnace, is communicated with an inner hot air cavity of the upper hearth and then is communicated with a hot air outlet via an outer hot air cavity, a smoke and dust cavity of the upper hearth is communicated with a smoke and dust channel via a smoke and dust channel opening and an induced draft fan, and the smoke and dust channel is communicated with a dust and smoke removal device; and a waste heat recovery mechanism comprises a fresh air inlet formed in the dust and smoke removal device, the fresh air inlet is communicated with a waste heat cavity of the dust and smoke removal device via a fresh air cavity in the dust and smoke removal device, a waste heat outlet is formed in one side of the waste heat cavity, a waste heat air feeder is arranged above the waste heat outlet and is communicated with the waste heat return duct.

Chinese Invention Patent Application No. 201310603146.0 discloses a high-efficiency multifunctional hot blast stove which comprises a hearth, wherein the hearth is communicated with a chimney, an insulating layer is arranged outside the hearth, a channel allowing air to flow through is formed between the insulating layer and the hearth, a water jacket is arranged under the channel, and a middle partition for extending the air path is arranged in the channel; and a top heating layer is arranged between the top of the hearth and the insulating layer, and a top partition for extending the air path is arranged in the top heating layer. Through the configuration of the water jacket, hot water or steam can be generated when hot air is produced; and through the configuration of an insulating water tank, water can circulate by itself or by means of a water pump, and the maximum water temperature is 100° C., so that the hearth side plate in the concentrated combustion zone of the stove body is protected against high-temperature damage.

Chinese Invention Patent Application No. 201210558824.1 discloses a novel steel-structure direct-fired jacket-type hot blast stove which consists of a stove housing, a mounting flange, a positioning ferrule, a combustion cylinder, a circular basin-type chassis, a conical mixing drum, a mounting sleeve, a cold air heat-exchange jacket, an insulating layer, a cold air inlet, a combustion device, a cold air supply device, and an automatic control system.

BRIEF SUMMARY OF THE INVENTION

To solve the abovementioned problems, the invention provides a control system and method for a frostless, multivariable coupling and heat pump-based hot blast stove. The technical solution of the control system and method is specifically as follows:

A control system and method for a frostless, multivariable coupling and heat pump-based hot blast stove are used for grain drying, and are characterized in that:

A first heat exchanger (4-2), a second heat exchanger (5-2), a main solution pool (7-12) and corresponding pipelines, and a temperature detector are configured in the control system;

A first heat pump unit consists of a first compressor (1-1), a first condenser (1-2), a first throttle device (1-3), a first evaporator (1-4) and a first gas-liquid separator (1-5) which are connected in sequence;

A second heat pump unit consists of a second compressor (2-1), a second condenser (2-2), a second throttle device (2-3), a second evaporator (2-4) and a second gas-liquid separator (2-5) which are connected in sequence;

A third heat pump unit consists of a third compressor (3-1), a third condenser (3-2), a third throttle device (3-3), a third evaporator (3-4) and a third gas-liquid separator (3-5) which are connected in sequence;

The first heat exchanger, the third condenser, the second condenser, the first condenser and the second heat exchanger are sequentially arranged on an air supply pipeline from a fresh air inlet to a fresh air outlet, so that a preheating zone constituted by the first heat exchanger, a low temperature zone constituted by the third condenser, a medium temperature zone constituted by the second condenser, and a high temperature zone constituted by the first condenser and the second heat exchanger are formed;

The control method specifically comprises the following steps:

S1: when the temperature detector detects that the external temperature is greater than or equal to 5° C., enabling a gradient heat-circulation preheating mode to form preheating-type gradient heat supply sequentially constituted by the preheating zone, the low temperature zone, the medium temperature zone and the high temperature zone; and S2: when the temperature detector detects that the external temperature is less than 5° C., enabling a gradient heat-circulation frostless mode to form frostless-type gradient heat supply sequentially constituted by a frostless operation, the low temperature zone, the medium temperature zone and the high temperature zone.

The control system and method for a frostless, multivariable coupling and heat pump-based hot blast stove of the invention are characterized in that:

In S1, the gradient heat-circulation preheating mode is implemented specifically through the following steps:

S11: starting the first compressor (1-1) to work to inject a high-temperature and high-pressure refrigerant into the first condenser (1-2) to be subjected to heat exchange, so that a first heat exchange region of the high temperature zone is formed; transporting, through a pipeline, the refrigerant subjected to heat exchange into the first heat exchanger (4-2) to be subjected to heat exchange, so that the preheating zone is formed; transporting, through a pipeline, the refrigerant subjected to heat exchange into the first throttle device (1-3);

S12: starting the second compressor (2-1) to work to inject the high-temperature and high-pressure refrigerant into the second condenser (2-2) to be subjected to heat exchange, so that the medium temperature zone is formed; transporting, through a pipeline, the refrigerant subjected to heat exchange into the second throttle device (2-3);

S13: starting the third compressor (3-1) to work to inject the high-temperature and high-pressure refrigerant into the second heat exchanger (5-2) to be subjected to heat exchange, so that a second heat exchange region of the high temperature zone is formed; and S14: transporting, through a pipeline, the refrigerant subjected to heat exchange in the second heat exchanger (5-2) into the third heat exchanger (3-2) to be subjected to heat exchange again, so that the low temperature zone is formed.

The control system and method for a frostless, multivariable coupling and heat pump-based hot blast stove of the invention are characterized in that:

In S2, the gradient heat-circulation frostless mode is implemented specifically through the following steps:

S21: starting the third compressor (3-1) to work to inject a high-temperature and high-pressure refrigerant into the second heat exchanger (5-2) to be subjected to heat exchange, so that a second heat exchange region of the high temperature zone is formed;

S22: transporting, through a pipeline, the refrigerant subjected to heat exchange in the second heat exchanger (5-2) into the third condenser (3-2) to be subjected to heat exchange again, so that the low temperature zone is formed;

S23: starting the second compressor (2-1) to work to inject the high-temperature and high-pressure refrigerant into the second condenser (2-2) to be subjected to heat exchange, so that the medium temperature zone is formed; transporting, through a pipeline, the refrigerant subjected to heat exchange into the second throttle device (2-3);

S24: starting the first compressor (1-1) to work to inject the high-temperature and high-pressure refrigerant into the first condenser (1-2) to be subjected to heat exchange, so that a first heat exchange region of the high temperature zone is formed; transporting, through a pipeline, the refrigerant subjected to heat exchange into the first throttle device (1-3); and S25: transporting, through a pipeline, a concentrated solution in the main solution pool (7-12) to corresponding spraying ends of the first evaporator (1-4), the second evaporator (2-4) and the third evaporator (3-4) to complete the frostless operation.

The control system and method for a frostless, multivariable coupling and heat pump-based hot blast stove of the invention are characterized in that:

A concentrated solution zone and a dilute solution zone are formed in the main solution pool;

A solution heat exchanger, a first solution pump (7-13) and a second solution pump (7-14) are arranged in the main solution pool; and Corresponding solution pools are separately arranged at the lower end of the first evaporator, the lower end of the second evaporator and the lower end of the third evaporator.

A frostless solution circulation pipeline is formed through the following steps:

SA1: transporting, by the first solution pump (7-13), a solution from the concentrated solution zone in the main solution pool to spraying ends of the first evaporator, the second evaporator and the third evaporator through a pipeline to perform the frostless operation, and enabling a dilute solution formed after spraying to flow into the corresponding solution pools;

SA2: collecting the dilute solution flowing into the solution pools into the dilute solution zone in the main solution pool through a pipeline; and SA3: transporting, through a pipeline where the second solution pump (7-14) is located, the dilute solution flowing into the main solution pool into a liquid passage of the solution heat exchanger to be subjected to heat exchange to separate water out, and then enabling the dilute solution with the water separated out to flow into the concentrated solution zone in the main solution pool.

The control system and method for a frostless, multivariable coupling and heat pump-based hot blast stove of the invention are characterized in that:

Heat for completing heat exchange of the solution heat exchanger is provided by the first heat pump unit, the second heat pump unit and the third heat pump unit jointly.

The control system and method for a frostless, multivariable coupling and heat pump-based hot blast stove of the invention are characterized in that:

The heat for completing heat exchange of the solution heat exchanger is provided through the following steps:

SS1: starting the first compressor (1-1) to work to inject the high-temperature and high-pressure refrigerant into the first condenser (1-2) to be subjected to heat exchange, so that the first heat exchange region of the high temperature zone is formed; transporting, through a pipeline, the refrigerant subjected to heat exchange into the solution heat exchanger to form a first heat source for heat exchange of the solution heat exchanger; transporting, through a pipeline, the refrigerant subjected to heat exchange into the first throttle device (1-3);

SS2: starting the second compressor (2-1) to work to inject the high-temperature and high-pressure refrigerant into the second condenser (2-2) to be subjected to heat exchange, so that the medium temperature zone is formed; transporting, through a pipeline, the refrigerant subjected to heat exchange into the solution heat exchanger to form a second heat source for heat exchange of the solution heat exchanger; transporting, through a pipeline, the refrigerant subjected to heat exchange into the second throttle device (2-3);

SS3: starting the third compressor (3-1) to work to inject the high-temperature and high-pressure refrigerant into the second heat exchanger (5-2) to be subjected to heat exchange, so that the second heat exchange region of the high temperature zone is formed;

Transporting, through a pipeline, the refrigerant subjected to heat exchange in the heat exchanger (5-2) into the second condenser (3-2) to be subjected to heat exchange again, so that the low temperature zone is formed; and Transporting, through a pipeline, the refrigerant subjected to heat exchange in the third condenser (3-2) into the solution heat exchanger to form a third heat source for heat exchange of the solution heat exchanger; transporting, through a pipeline, the refrigerant subjected to heat exchange into the third throttle device (3-3).

The control system and method for a frostless, multivariable coupling and heat pump-based hot blast stove of the invention are characterized in that:

A first dry filter (1-6) is arranged on a pipeline between the first condenser (1-2) and the first throttle device (1-3);

A second dry filter (2-6) is arranged on a pipeline between the second condenser (2-2) and the second throttle device (2-3); and A third dry filter (3-6) is arranged on a pipeline between the third condenser (3-2) and the third throttle device (3-3).

The control system and method for a frostless, multivariable coupling and heat pump-based hot blast stove of the invention are characterized in that:

The solution pools at the lower ends of the evaporators are arranged physically above the main solution pool in space; and The dilute solution in the solution pools flows into the dilute solution zone of the main solution pool by gravity.

According to the control system and method for a frostless, multivariable coupling and heat pump-based hot blast stove of the invention, First, the first heat pump unit, the second heat pump unit, the third heat pump unit, the first heat exchanger and the second heat exchanger are arranged to form a heat source;

Second, through the structural configuration of the facilities, the preheating zone, the low temperature zone, the medium temperature zone and the high temperature zone are sequentially formed on the air supply pipeline from the air inlet to the air outlet, so that gradient utilization of heat on the air supply pipeline is realized;

Third, a frostless facility is arranged to complete the frostless operation in winter; and Fourth, heat for heat exchange in the frostless facility is provided by the first heat pump unit, the second heat pump unit and the third heat pump unit, so that no additional heat pump unit needs to be provided.

In the figures: 1-1, first compressor; 2-1, second compressor; 3-1, third compressor; 1-5, first gas-liquid separator; 2-5, second gas-liquid separator; 3-5, third gas-liquid separator; 1-4, first evaporator; 2-4, second evaporator; 3-4, third evaporator; 1-3, first throttle device; 2-3, second throttle device; 3-3, third throttle device; 1-6, first dry filter; 2-6, second dry filter; 3-6, third dry filter; 1-2, first condenser; 2-2, second condenser; 3-2, third condenser; 4-2, first heat exchanger; 5-2, second heat exchanger; 1-7, 1-8, 1-9, 2-7, 2-8, 3-7, 3-8, 3-9, 3-10, electromagnetic valve; 7-13, first solution pump; 7-14, second solution pump.

DETAILED DESCRIPTION OF THE INVENTION

The control system and method for a frostless, multivariable coupling and heat pump-based hot blast stove of the invention are further expounded below with reference to the accompanying drawings and specific embodiments.

Figure 1:
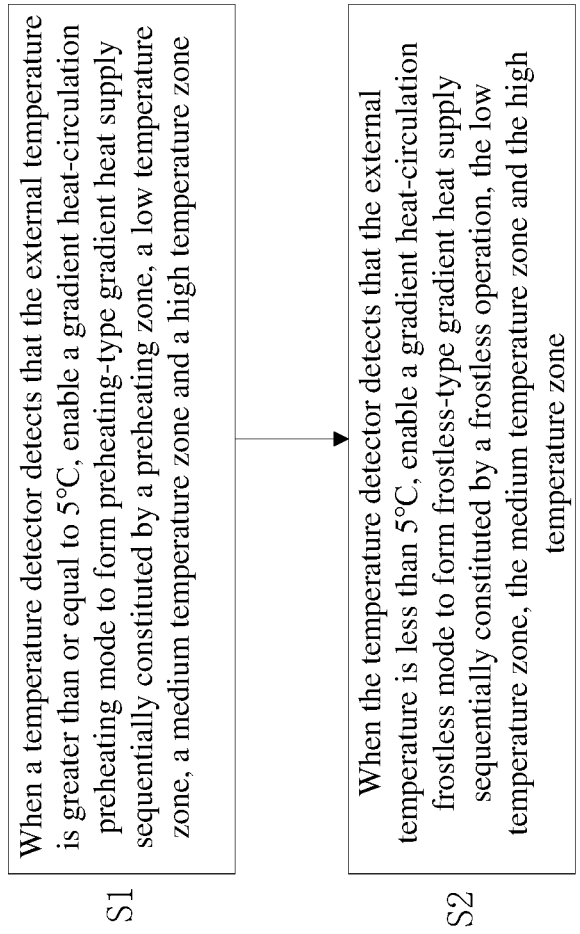
FIG. 1 is a flow diagram of the steps of the invention.

As shown in FIG. 1, the control system and method for a frostless, multivariable coupling and heat pump-based hot blast stove are used for grain drying, and are characterized in that:

A first heat exchanger (4-2), a second heat exchanger (5-2), a main solution pool (7-12) and corresponding pipelines, and a temperature detector are configured in the control system;

A first heat pump unit consists of a first compressor (1-1), a first condenser (1-2), a first throttle device (1-3), a first evaporator (1-4) and a first gas-liquid separator (1-5) which are connected in sequence;

A second heat pump unit consists of a second compressor (2-1), a second condenser (2-2), a second throttle device (2-3), a second evaporator (2-4) and a second gas-liquid separator (2-5) which are connected in sequence;

A third heat pump unit consists of a third compressor (3-1), a third condenser (3-2), a third throttle device (3-3), a third evaporator (3-4) and a third gas-liquid separator (3-5) which are connected in sequence;

The first heat exchanger, the third condenser, the second condenser, the first condenser and the second heat exchanger are sequentially arranged on an air supply pipeline from a fresh air inlet to a fresh air outlet, so that a preheating zone constituted by the first heat exchanger, a low temperature zone constituted by the third condenser, a medium temperature zone constituted by the second condenser, and a high temperature zone constituted by the first condenser and the second heat exchanger are formed;

The control method specifically comprises the following steps:

S1: when the temperature detector detects that the external temperature is greater than or equal to 5° C., a gradient heat-circulation preheating mode is enabled to form preheating-type gradient heat supply sequentially constituted by the preheating zone, the low temperature zone, the medium temperature zone and the high temperature zone; and S2: when the temperature detector detects that the external temperature is less than 5° C., a gradient heat-circulation frostless mode is enabled to form frostless-type gradient heat supply sequentially constituted by a frostless operation, the low temperature zone, the medium temperature zone and the high temperature zone.

Figure 2:
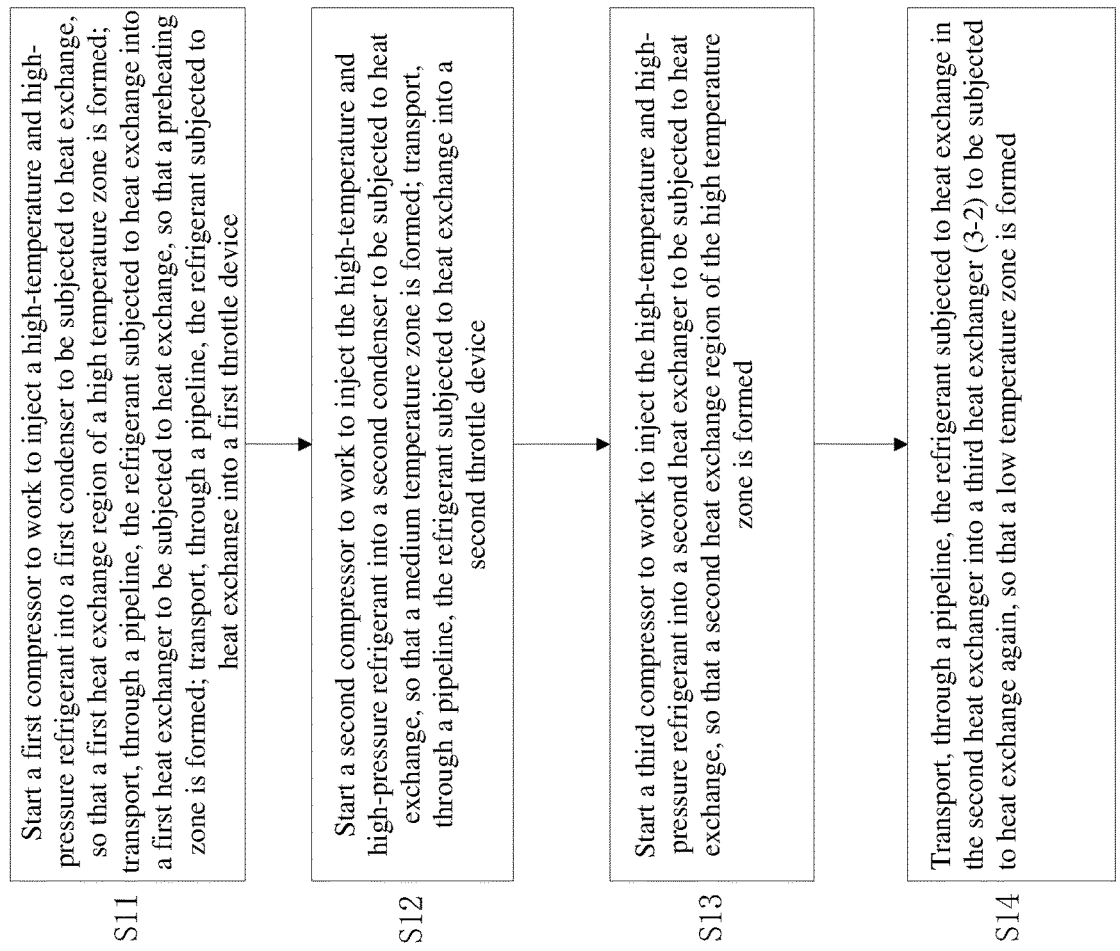
FIG. 2 is flow diagram of the steps of a gradient heat-circulation preheating mode of the invention.

Wherein,

In S1, the gradient heat-circulation preheating mode is implemented specifically through the following steps (as shown in FIG. 2):

S11: the first compressor (1-1) is started to work to inject a high-temperature and high-pressure refrigerant into the first condenser (1-2) to be subjected to heat exchange, so that a first heat exchange region of the high temperature zone is formed; the refrigerant subjected to heat exchange is transported into the first heat exchanger (4-2) through a pipeline to be subjected to heat exchange, so that the preheating zone is formed; the refrigerant subjected to heat exchange is transported into the first throttle device (1-3) through a pipeline;

S12: the second compressor (2-1) is started to work to inject the high-temperature and high-pressure refrigerant into the second condenser (2-2) to be subjected to heat exchange, so that the medium temperature zone is formed; the refrigerant subjected to heat exchange is transported into the second throttle device (2-3) through a pipeline;

S13: the third compressor (3-1) is started to work to inject the high-temperature and high-pressure refrigerant into the second heat exchanger (5-2) to be subjected to heat exchange, so that a second heat exchange region of the high temperature zone is formed; and S14: the refrigerant subjected to heat exchange in the second heat exchanger (5-2) is transported into the third heat exchanger (3-2) through a pipeline to be subjected to heat exchange again, so that the low temperature zone is formed.

Figure 3:
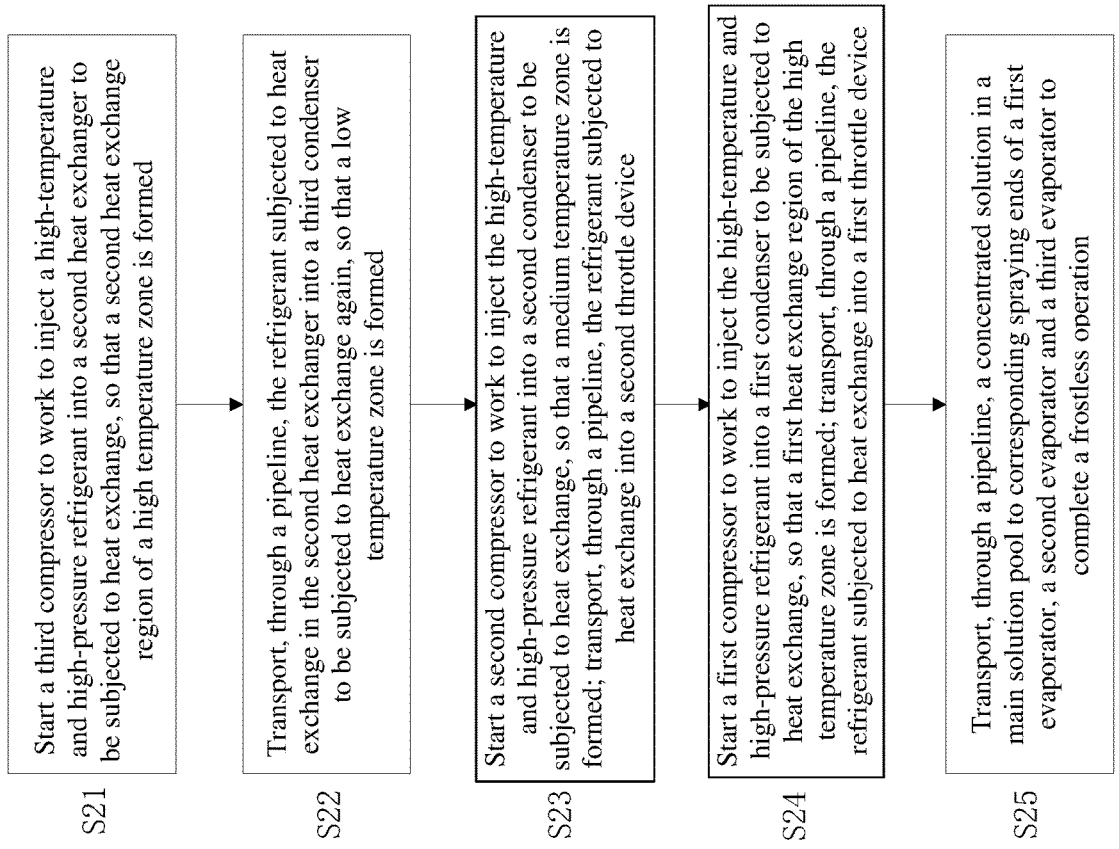
FIG. 3 is a flow diagram of the steps of a gradient heat-circulation frostless mode of the invention.

Wherein,

In S2, the gradient heat-circulation frostless mode is implemented specifically through the following steps (as shown in FIG. 3):

S21: the third compressor (3-1) is started to work to inject a high-temperature and high-pressure refrigerant into the second heat exchanger (5-2) to be subjected to heat exchange, so that a second heat exchange region of the high temperature zone is formed;

S22: the refrigerant subjected to heat exchange in the second heat exchanger (5-2) is transported into the third condenser (3-2) to be subjected to heat exchange again, so that the low temperature zone is formed;

S23: the second compressor (2-1) is started to work to inject the high-temperature and high-pressure refrigerant into the second condenser (2-2) to be subjected to heat exchange, so that the medium temperature zone is formed; the refrigerant subjected to heat exchange is transported into the second throttle device (2-3) through a pipeline;

S24: the first compressor (1-1) is started to work to inject the high-temperature and high-pressure refrigerant into the first condenser (1-2) to be subjected to heat exchange, so that a first heat exchange region of the high temperature zone is formed; the refrigerant subjected to heat exchange is transported into the first throttle device (1-3) through a pipeline; and S25: a concentrated solution in the main solution pool (7-12) is transported to corresponding spraying ends of the first evaporator (1-4), the second evaporator (2-4) and the third evaporator (3-4) through a pipeline to complete the frostless operation.

Wherein,

A concentrated solution zone and a dilute solution zone are formed in the main solution pool;

A solution heat exchanger, a first solution pump (7-13) and a second solution pump (7-14) are arranged in the main solution pool; and Corresponding solution pools are separately arranged at the lower end of the first evaporator, the lower end of the second evaporator and the lower end of the third evaporator.

Figure 4:
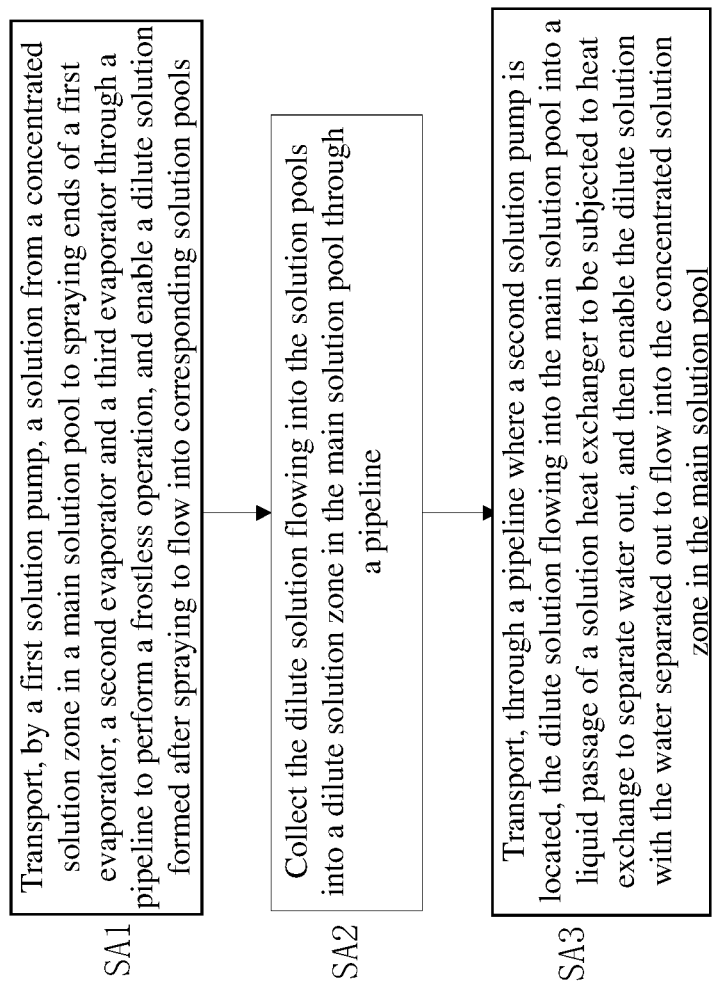
FIG. 4 is a flow diagram of solution circulation of the invention.

A frostless solution circulation pipeline is formed through the following steps (as shown in FIG. 4):

SA1: the first solution pump (7-13) transports a solution from the concentrated solution zone in the main solution pool to spraying ends of the first evaporator, the second evaporator and the third evaporator through a pipeline to perform the frostless operation, and a dilute solution formed after spraying flows into the corresponding solution pools;

SA2: the dilute solution flowing into the solution pools is collected into the dilute solution zone in the main solution pool through a pipeline; and SA3: the dilute solution flowing into the main solution pool is transported into a liquid passage of the solution heat exchanger, through a pipeline where the second solution pump (7-14) is located, to be subjected to heat exchange to separate water out, and then, the dilute solution with the water separated out flows into the concentrated solution zone in the main solution pool.

Wherein,

Heat for completing heat exchange of the solution heat exchanger is provided by the first heat pump unit, the second heat pump unit and the third heat pump unit jointly.

Figure 5:
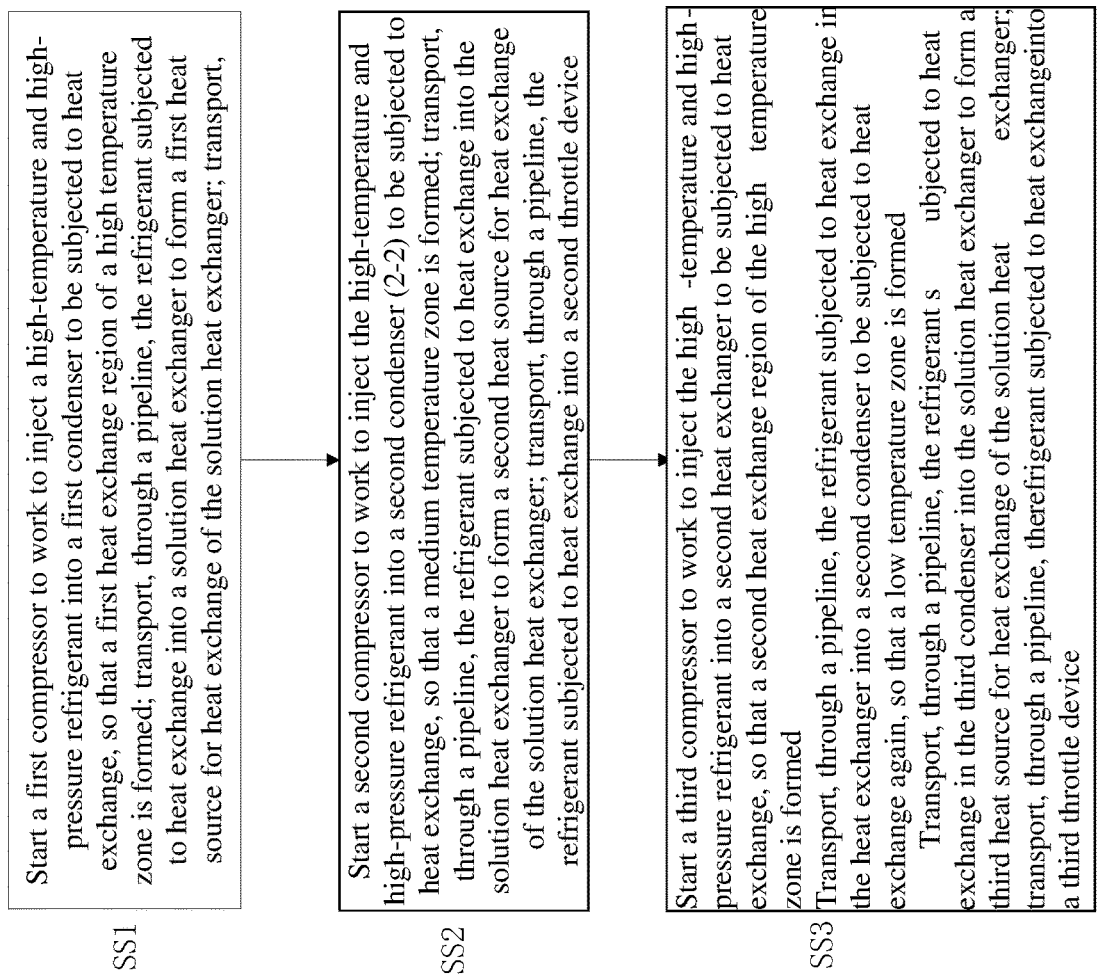
FIG. 5 is a flow diagram of heat supply of a solution heat exchanger of the invention.

Wherein,

The heat for completing heat exchange of the solution heat exchanger is provided through the following steps (as shown in FIG. 5):

SS1: the first compressor (1-1) is started to work to inject the high-temperature and high-pressure refrigerant into the first condenser (1-2) to be subjected to heat exchange, so that the first heat exchange region of the high temperature zone is formed; the refrigerant subjected to heat exchange is transported into the solution heat exchanger through a pipeline to form a first heat source for heat exchange of the solution heat exchanger; the refrigerant subjected to heat exchange is transported into the first throttle device (1-3) through a pipeline;

SS2: the second compressor (2-1) is started to work to inject the high-temperature and high-pressure refrigerant into the second condenser (2-2) to be subjected to heat exchange, so that the medium temperature zone is formed; the refrigerant subjected to heat exchange is transported into the solution heat exchanger through a pipeline to form a second heat source for heat exchange of the solution heat exchanger; the refrigerant subjected to heat exchange is transported into the second throttle device (2-3) through a pipeline;

SS3: the third compressor (3-1) is started to work to inject the high-temperature and high-pressure refrigerant into the second heat exchanger (5-2) to be subjected to heat exchange, so that the second heat exchange region of the high temperature zone is formed;

The refrigerant subjected to heat exchange in the heat exchanger (5-2) is transported into the second condenser (3-2) through a pipeline to be subjected to heat exchange again, so that the low temperature zone is formed; and The refrigerant subjected to heat exchange in the third condenser (3-2) is transported into the solution heat exchanger through a pipeline to form a third heat source for heat exchange of the solution heat exchanger, and the refrigerant subjected to heat exchange is transported into the third throttle device (3-3) through a pipeline.

Wherein,

A first dry filter (1-6) is arranged on a pipeline between the first condenser (1-2) and the first throttle device (1-3);

A second dry filter (2-6) is arranged on a pipeline between the second condenser (2-2) and the second throttle device (2-3); and A third dry filter (3-6) is arranged on a pipeline between the third condenser (3-2) and the third throttle device (3-3).

Wherein,

The solution pools at the lower ends of the evaporators are arranged physically above the main solution pool in space; and The dilute solution in the solution pools flows into the dilute solution zone of the main solution pool by gravity.

Figure 6:
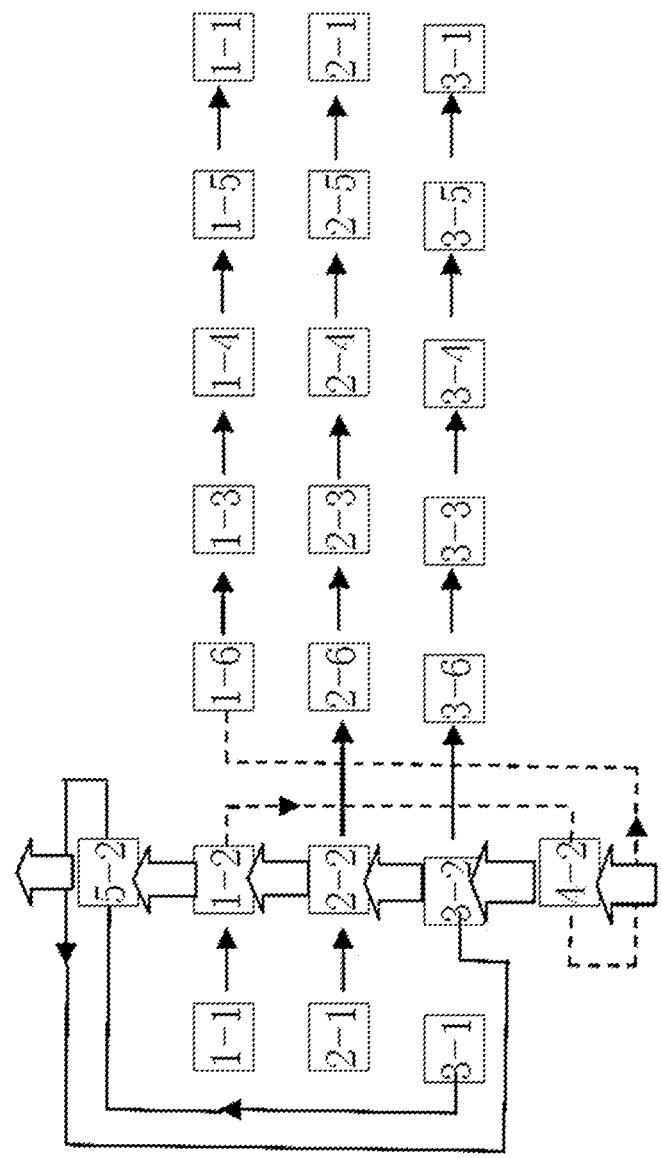
FIG. 6 is a step diagram of the gradient heat-circulation preheating mode of the invention.
Figure 7:
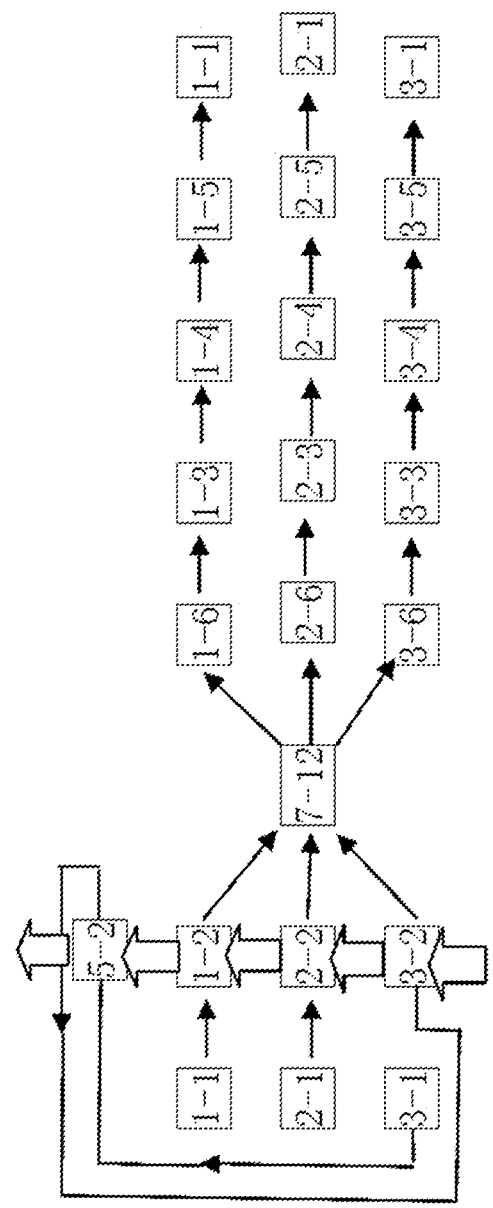
FIG. 7 is a step diagram of the gradient heat-circulation frostless mode of the invention.

Working Process:

When the outdoor environmental temperature is greater than or equal to 5° C., the gradient heat-circulation preheating mode is enabled (as shown in FIG. 6); or, when the outdoor environmental temperature is smaller than 5° C., the gradient heat-circulation frostless mode is enabled (as shown in FIG. 7).

Workflow of the refrigerating system: the compressors 1 suck in a low-temperature and low-pressure gaseous refrigerant and then work to compress the low-temperature and low-pressure gaseous refrigerant into a high-temperature and high-pressure gaseous refrigerant, which is discharged into the condensers 2 to be condensed into a liquid refrigerant, dissipated heat is transferred into heated air, the liquid refrigerant is dried and filtered by the dry filters 6 to remove water and impurities in the refrigerant, afterwards, the liquid refrigerant is throttled and depressurized by throttle valves 3 and then flows into the evaporators, and the evaporators 4 absorb heat in air to turn the liquid refrigerant into a gaseous refrigerant, which in turn flows into the gas-liquid separators 5 and is then sucked into the compressors again via the openings, so that a closed thermal cycle system is formed.

Workflow of the heat pump hot-air system: in summer, waste heat generated by the refrigerant at the outlet of the first condenser 1-2 enters the heat exchanger 4-2 via an electromagnetic valve 1-8 to preheat fresh air, so that a preheating zone is formed; exhaust air made by the third compressor 3-1 enters the heat exchanger 5-2 via an electromagnetic valve 3-8 and then returns to the condenser 3-2, and the condenser 3-2 heats the fresh air for the first time, so that a low temperature zone is formed; exhaust air made by the second compressor 2-1 directly enters the condenser 2-2, and the condenser 2-2 heats the fresh air for the second time, so that a medium temperature zone is formed; and exhaust air from the first compressor 1-1 enters the condenser 1-2, and the fresh air is heated by the condenser 1-2 for the third time and is then heated by the heat exchanger 5-2 for the fourth time, so that a high temperature zone is formed. In this way, a heat pump hot-air cycle is formed.

Figure 8:
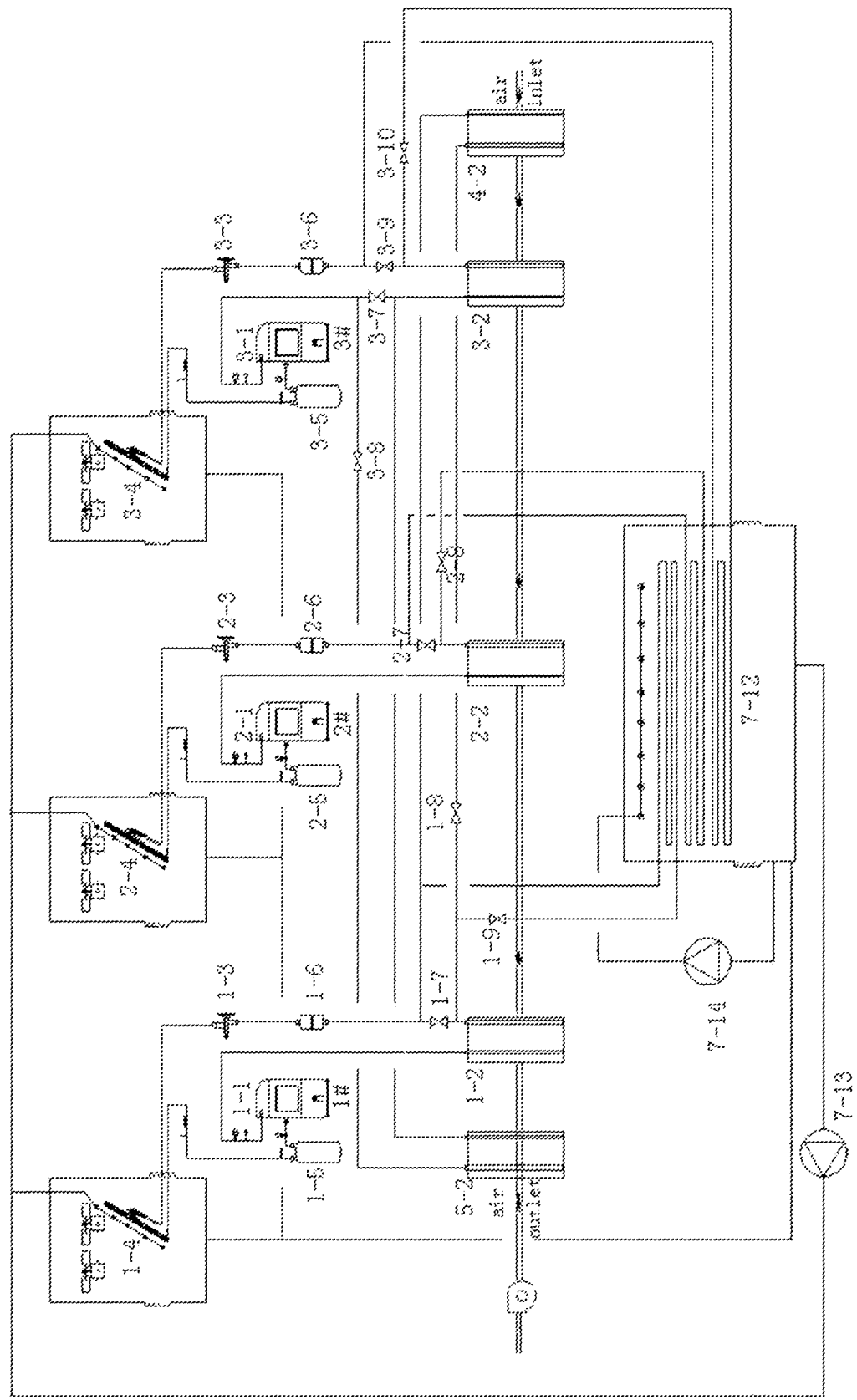
FIG. 8 is a structural diagram of a system of the invention.

Workflow of the frostless system: a concentrated solution in the main solution pool 7-12 is pumped by the solution pump 7-13 to spray pipelines of the evaporators and is then uniformly sprayed to the air environment around the fins to absorb moisture in air, so that the dew point temperature of the air environment is decreased, and the concentrated solution turns into a diluted solution, which is stored in the solution pools on the lower sides of the evaporators 4 and flows back to the main solution pool 7-12 by gravity when reaching a certain level; and the diluted solution is pumped by the pump solution 7-14 into the heat exchanger above the solution pools to be subjected to heat exchange and turns into a concentrated solution again after water is separated out. The system structure is shown in FIG. 8.

According to the control system and method for a frostless, multivariable coupling and heat pump-based hot blast stove of the invention, First, the first heat pump unit, the second heat pump unit, the third heat pump unit, the first heat exchanger and the second heat exchanger are arranged to form a heat source;

Second, through the structural configuration of the facilities, the preheating zone, the low temperature zone, the medium temperature zone and the high temperature zone are sequentially formed on the air supply pipeline from the air inlet to the air outlet, so that gradient utilization of heat on the air supply pipeline is realized;

Third, a frostless facility is arranged to complete the frostless operation in winter; and Fourth, heat for heat exchange in the frostless facility is provided by the first heat pump unit, the second heat pump unit and the third heat pump unit, so that no additional heat pump unit needs to be provided.

What is claimed is:

1. A control system for a frostless, multivariable coupling and heat pump-based hot blast stove, used for grain heating, and characterized in that:

a first heat exchanger (4-2), a second heat exchanger (5-2), a main solution pool (7-12) and corresponding pipelines, and a temperature detector are configured in the control system;

a first heat pump unit consists of a first compressor (1-1), a first condenser (1-2), a first throttle device (1-3), a first evaporator (1-4) and a first gas-liquid separator (1-5) which are connected in sequence;

a second heat pump unit consists of a second compressor (2-1), a second condenser (2-2), a second throttle device (2-3), a second evaporator (2-4) and a second gas-liquid separator (2-5) which are connected in sequence;

a third heat pump unit consists of a third compressor (3-1), a third condenser (3-2), a third throttle device (3-3), a third evaporator (3-4) and a third gas-liquid separator (3-5) which are connected in sequence;

the first heat exchanger, the third condenser, the second condenser, the first condenser and the second heat exchanger are sequentially arranged on an air supply pipeline from a fresh air inlet to a fresh air outlet, so that a preheating zone constituted by the first heat exchanger, a low temperature zone constituted by the third condenser, a medium temperature zone constituted by the second condenser, and a high temperature zone constituted by the first condenser and the second heat exchanger are formed;

S1: when the temperature detector detects that an external temperature is greater than or equal to 5° C., enabling a gradient heat-circulation preheating mode to form preheating-type gradient heat supply sequentially constituted by the preheating zone, the low temperature zone, the medium temperature zone and the high temperature zone; and S2: when the temperature detector detects that the external temperature is less than 5° C., enabling a gradient heat-circulation frostless mode to form frostless-type gradient heat supply sequentially constituted by a frostless operation, the low temperature zone, the medium temperature zone and the high temperature zone.

2. The control system for the frostless, multivariable coupling and heat pump-based hot blast stove according to claim 1, wherein:

in S1, the gradient heat-circulation preheating mode is implemented specifically through the following steps:

S11: starting the first compressor (1-1) to work to inject a high-temperature and high-pressure refrigerant into the first condenser (1-2) to be subjected to heat exchange, so that a first heat exchange region of the high temperature zone is formed; transporting, through a pipeline, the refrigerant subjected to heat exchange into the first heat exchanger (4-2) to be subjected to heat exchange, so that the preheating zone is formed; transporting, through a pipeline, the refrigerant subjected to heat exchange into the first throttle device (1-3);

S12: starting the second compressor (2-1) to work to inject the high-temperature and high-pressure refrigerant into the second condenser (2-2) to be subjected to heat exchange, so that the medium temperature zone is formed; transporting, through a pipeline, the refrigerant subjected to heat exchange into the second throttle device (2-3);

S13: starting the third compressor (3-1) to work to inject the high-temperature and high-pressure refrigerant into the second heat exchanger (5-2) to be subjected to heat exchange, so that a second heat exchange region of the high temperature zone is formed; and S14: transporting, through a pipeline, the refrigerant subjected to heat exchange in the second heat exchanger (5-2) into the third heat exchanger (3-2) to be subjected to heat exchange again, so that the low temperature zone is formed.

3. The control system for the frostless, multivariable coupling and heat pump-based hot blast stove according to claim 1, wherein:

In S2, the gradient heat-circulation frostless mode is implemented specifically through the following steps:

S21: starting the third compressor (3-1) to work to inject a high-temperature and high-pressure refrigerant into the second heat exchanger (5-2) to be subjected to heat exchange, so that a second heat exchange region of the high temperature zone is formed;

S22: transporting, through a pipeline, the refrigerant subjected to heat exchange in the second heat exchanger (5-2) into the third condenser (3-2) to be subjected to heat exchange again, so that the low temperature zone is formed;

S23: starting the second compressor (2-1) to work to inject the high-temperature and high-pressure refrigerant into the second condenser (2-2) to be subjected to heat exchange, so that the medium temperature zone is formed; transporting, through a pipeline, the refrigerant subjected to heat exchange into the second throttle device (2-3);

S24: starting the first compressor (1-1) to work to inject the high-temperature and high-pressure refrigerant into the first condenser (1-2) to be subjected to heat exchange, so that a first heat exchange region of the high temperature zone is formed; transporting, through a pipeline, the refrigerant subjected to heat exchange into the first throttle device (1-3); and S25: transporting, through a pipeline, a concentrated solution in the main solution pool (7-12) to corresponding spraying ends of the first evaporator (1-4), the second evaporator (2-4) and the third evaporator (3-4) to complete the frostless operation.

4. The control system for the frostless, multivariable coupling and heat pump-based hot blast stove according to claim 1, wherein:

a first dry filter (1-6) is arranged on a pipeline between the first condenser (1-2) and the first throttle device (1-3);

a second dry filter (2-6) is arranged on a pipeline between the second condenser (2-2) and the second throttle device (2-3); and a third dry filter (3-6) is arranged on a pipeline between the third condenser (3-2) and the third throttle device (3-3).

5. The control system for the frostless, multivariable coupling and heat pump-based hot blast stove according to claim 1, wherein:

a concentrated solution zone and a dilute solution zone are formed in the main solution pool;

a solution heat exchanger, a first solution pump (7-13) and a second solution pump (7-14) are arranged in the main solution pool; and corresponding solution pools are separately arranged at a lower end of the first evaporator, a lower end of the second evaporator and a lower end of the third evaporator, a frostless solution circulation pipeline is formed through the following steps:

SA1: transporting, by the first solution pump (7-13), a solution from the concentrated solution zone in the main solution pool to spraying ends of the first evaporator, the second evaporator and the third evaporator through a pipeline to perform the frostless operation, and enabling a dilute solution formed after spraying to flow into the corresponding solution pools;

SA2: collecting the dilute solution flowing into the solution pools into the dilute solution zone in the main solution pool through a pipeline; and SA3: transporting, through a pipeline where the second solution pump (7-14) is located, the dilute solution flowing into the main solution pool into a liquid passage of the solution heat exchanger to be subjected to heat exchange to separate water out, and then enabling the dilute solution with the water separated out to flow into the concentrated solution zone in the main solution pool.

6. The control system for the frostless, multivariable coupling and heat pump-based hot blast stove according to claim 5, wherein:

heat for completing heat exchange of the solution heat exchanger is provided by the first heat pump unit, the second heat pump unit and the third heat pump unit jointly.

7. The control system for the frostless, multivariable coupling and heat pump-based hot blast stove according to claim 5, wherein:

the heat for completing heat exchange of the solution heat exchanger is provided through the following steps:

SS1: starting the first compressor (1-1) to work to inject the high-temperature and high-pressure refrigerant into the first condenser (1-2) to be subjected to heat exchange, so that the first heat exchange region of the high temperature zone is formed; transporting, through a pipeline, the refrigerant subjected to heat exchange into the solution heat exchanger to form a first heat source for heat exchange of the solution heat exchanger; transporting, through a pipeline, the refrigerant subjected to heat exchange into the first throttle device (1-3);

SS2: starting the second compressor (2-1) to work to inject the high-temperature and high-pressure refrigerant into the second condenser (2-2) to be subjected to heat exchange, so that the medium temperature zone is formed; transporting, through a pipeline, the refrigerant subjected to heat exchange into the solution heat exchanger to form a second heat source for heat exchange of the solution heat exchanger; transporting, through a pipeline, the refrigerant subjected to heat exchange into the second throttle device (2-3);

SS3: starting the third compressor (3-1) to work to inject the high-temperature and high-pressure refrigerant into the second heat exchanger (5-2) to be subjected to heat exchange, so that the second heat exchange region of the high temperature zone is formed;

transporting, through a pipeline, the refrigerant subjected to heat exchange in the heat exchanger (5-2) into the second condenser (3-2) to be subjected to heat exchange again, so that the low temperature zone is formed; and transporting, through a pipeline, the refrigerant subjected to heat exchange in the third condenser (3-2) into the solution heat exchanger to form a third heat source for heat exchange of the solution heat exchanger; transporting, through a pipeline, the refrigerant subjected to heat exchange into the third throttle device (3-3).

8. The control system for the frostless, multivariable coupling and heat pump-based hot blast stove according to claim 5, wherein:

the solution pools at the lower ends of the evaporators are arranged physically above the main solution pool in space; and the dilute solution in the solution pools flows into the dilute solution zone of the main solution pool by gravity.

* * * * *